(12) United States Patent
Peach et al.

(10) Patent No.: US 9,000,835 B1
(45) Date of Patent: Apr. 7, 2015

(54) HOT RF RECTIFIERS FOR RFID APPLICATIONS

(71) Applicant: Impinj, Inc., Seattle, WA (US)

(72) Inventors: Charles Peach, Seattle, WA (US); Jay Kuhn, Seattle, WA (US); John Hyde, Corvallis, OR (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 14/213,596

(22) Filed: Mar. 14, 2014

Related U.S. Application Data

(60) Provisional application No. 61/782,787, filed on Mar. 14, 2013.

(51) Int. Cl.
*G05F 1/10* (2006.01)
*G05F 3/02* (2006.01)
*G05F 3/08* (2006.01)

(52) U.S. Cl.
CPC .......................................... *G05F 3/08* (2013.01)

(58) Field of Classification Search
USPC ........................................................... 327/536
See application file for complete search history.

(56) References Cited

U.S. PATENT DOCUMENTS

| 7,768,406 B1* | 8/2010 | Peach et al. ................. 340/572.7 |
| 8,428,515 B1* | 4/2013 | Oliver ........................... 455/41.2 |
| 2009/0237220 A1* | 9/2009 | Oliver et al. ............... 340/10.34 |

* cited by examiner

*Primary Examiner* — Quan Tra
(74) *Attorney, Agent, or Firm* — Turk IP Law, LLC

(57) ABSTRACT

A Radio Frequency Identification (RFID) tag integrated circuit (IC) includes a power rectifier component. The rectifier component includes a first current path formed by a first rectifying element, a second rectifying element, and a pump node coupled to the first and second rectifying elements. The first and second rectifying elements are coupled to a first phase of a radio frequency (RF) waveform while the pump node is coupled to a second phase of the RF waveform. The rectifier component also includes at least one biasing element coupled to the pump node and configured such that its terminal voltages vary with phases and amplitudes similar to that of the second phase of the RF waveform.

20 Claims, 8 Drawing Sheets

SIGNAL PATH DURING R→T

SIGNAL PATH DURING T→R

HOT RF RECTIFIERS FOR RFID APPLICATIONS

CROSS REFERENCE TO RELATED APPLICATIONS

This application claims the benefit of U.S. Provisional Patent Application Serial No. 61/782,787 filed on Mar. 14, 2013. The disclosures of this application are hereby incorporated by reference for all purposes.

BACKGROUND

Radio-Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy—and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to a power rectifier component for an RFID tag integrated circuit (IC). The rectifier component includes a first current path formed by a first rectifying element, a second rectifying element, and a pump node coupled to the first and second rectifying elements. The first and second rectifying elements are coupled to a first phase of a radio frequency (RF) waveform while the pump node is coupled to a second phase of the RF waveform. The rectifier component also includes at least one biasing element coupled to the pump node and configured such that its terminal voltages vary with phases and amplitudes similar to that of the second phase of the RF waveform.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions. A command typically includes one or more tag instructions that cause a tag to perform one or more actions and a command code that identifies the command and/or the tag instructions. "Protocol" refers to an industry standard for communications between a reader and a tag (and vice versa), such as the Class-1 Generation-2 UHF RFID Protocol for Communications at 860 MHz-960 MHz by EPCglobal, Inc. ("Gen2 Specification"), versions 1.2.0 and 2.0 of which are hereby incorporated by reference.

Figure 1:
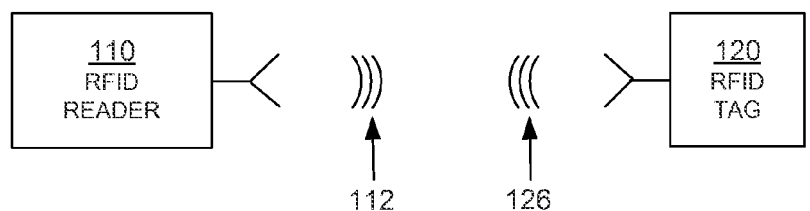
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
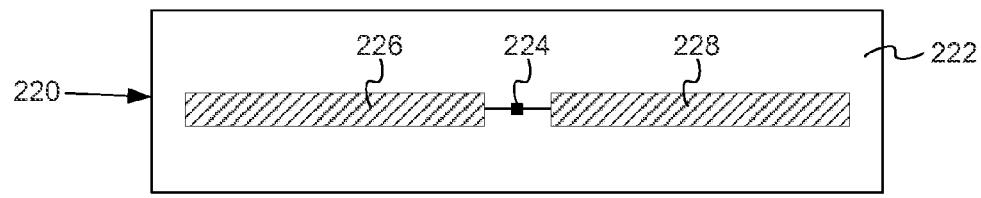
FIG. 2 is a diagram showing components of a passive RFID tag, such as a tag that can be used in the system of FIG. 1.
Figure 2:
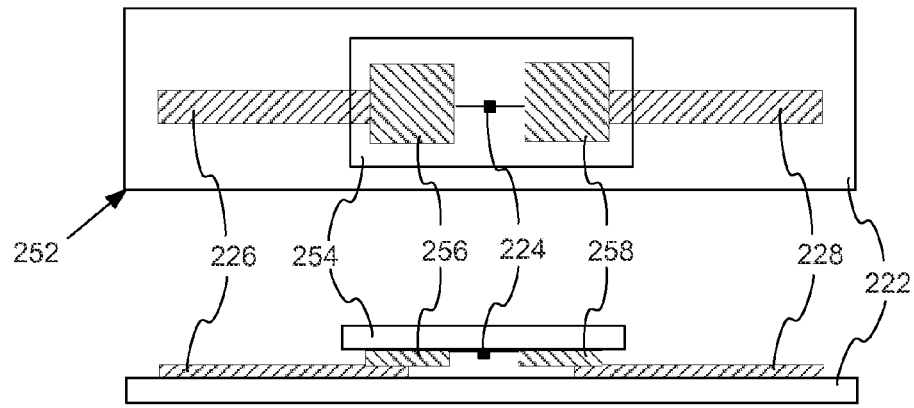
Figure 2:
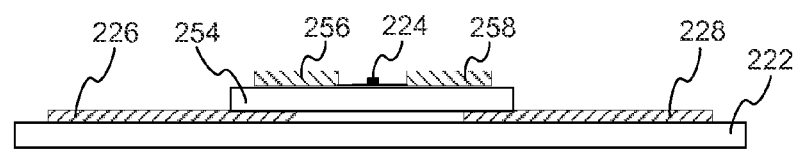

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

Figure 3:
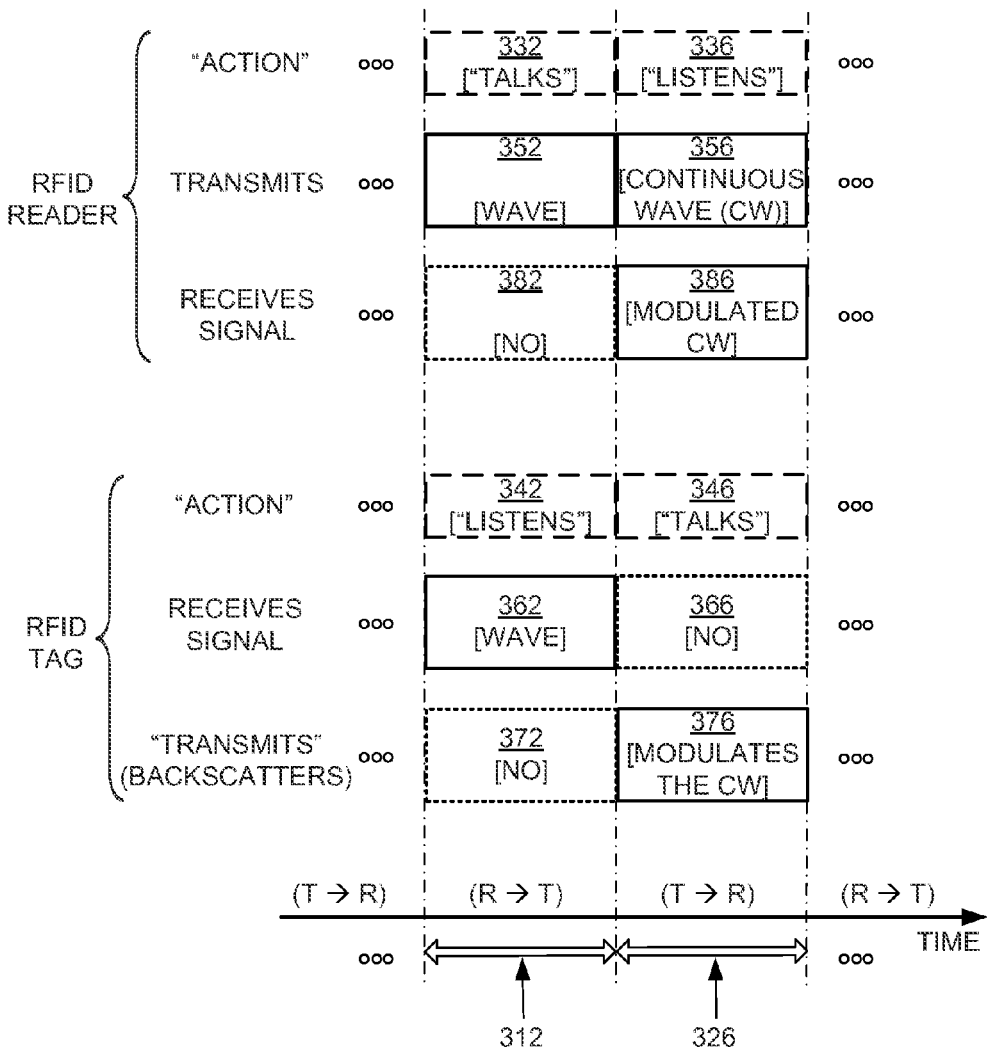
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
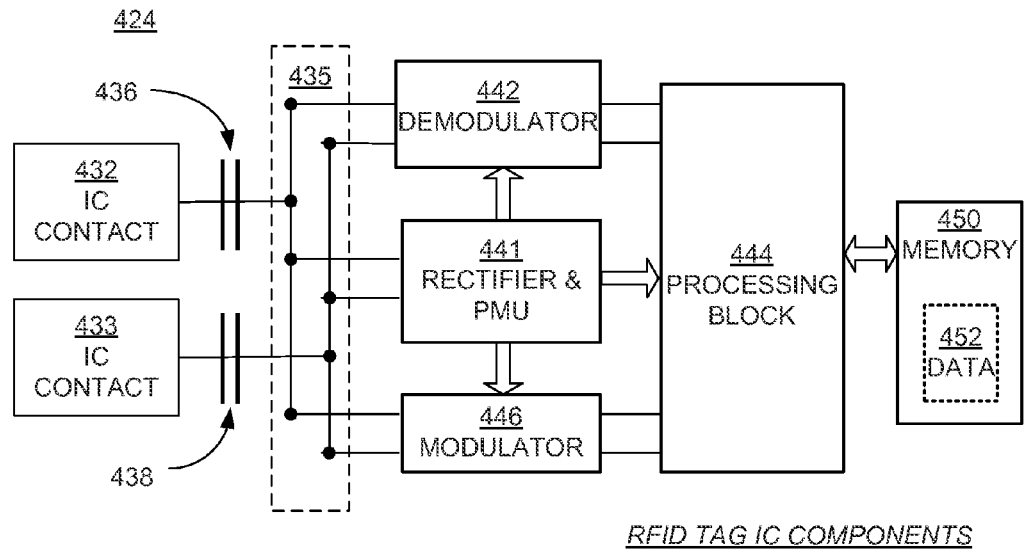
FIG. 4 is a block diagram showing a detail of an RFID tag, such as the one shown in FIG. 2.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/288 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches that can selectively route a signal, and so on. In some embodiments, circuit 424 includes optional capacitors 436 and/or 438. If present, capacitors 436/438 capacitively couple IC contacts 432/433 to signal-routing section 435, which in turn electrically couples to other components of circuit 424 described below. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or at least partly external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

Figure 5A:
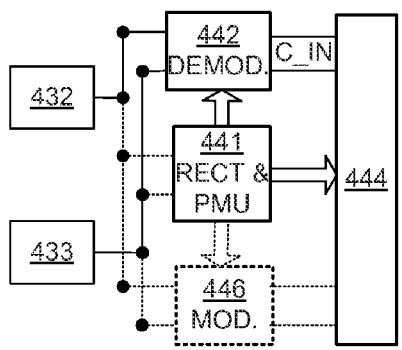
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

Figure 5B:
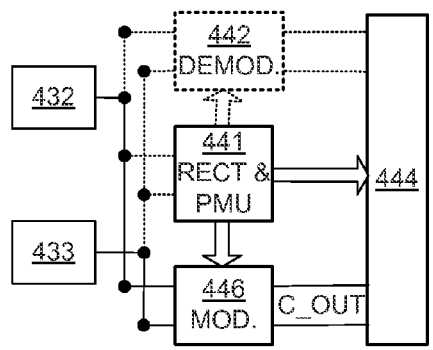

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6A:
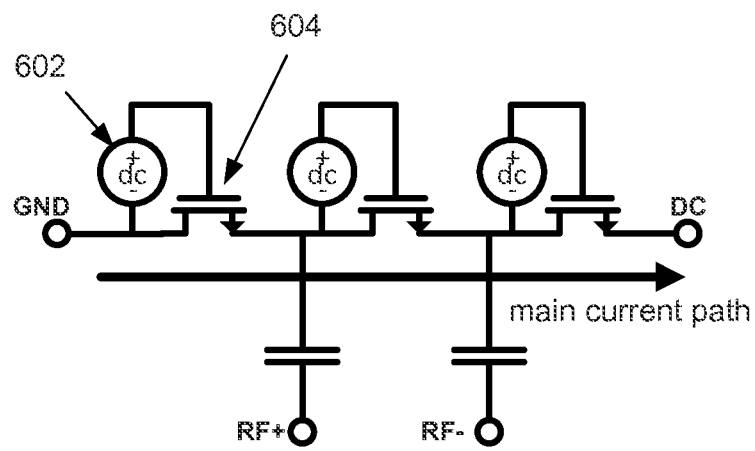
FIGS. 6A and 6B illustrate bias batteries for NMOS and PMOS/NMOS circuit topologies.
Figure 6B:
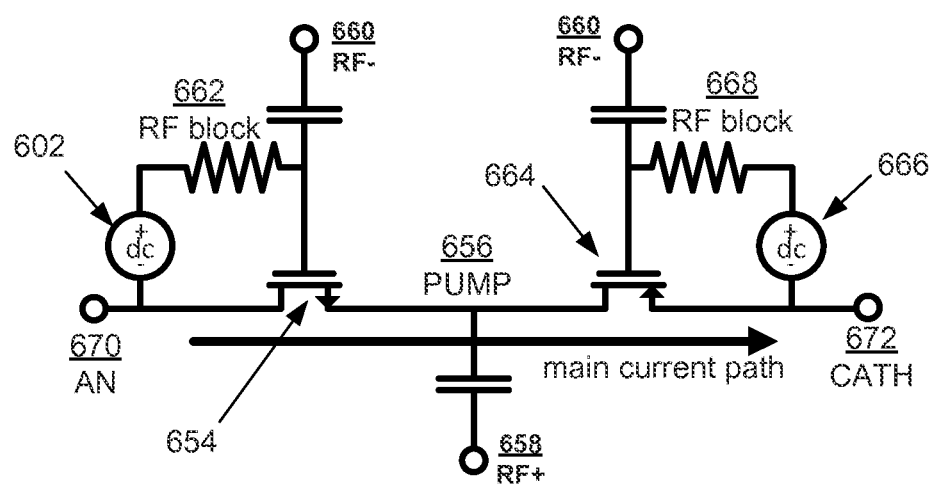

In some embodiments, the performance of a rectifier or charge pump may be improved by biasing one or more rectifying elements in the rectifier/charge pump. For example, if a rectifier uses transistors as rectifying elements, "bias batteries" may be added to provide a direct current (DC) or non-time-varying bias to the gate of the transistors. FIG. 6A depicts a rectifier/charge pump 600 with a series of n-channel metal-oxide semiconductor (NMOS) transistors arranged to serve as rectifying elements along a rectifier main current path. Each NMOS transistor, such as transistor 604, has a DC bias 602 connected between its gate and drain, which provides a positive DC voltage bias to the gate with respect to the drain. FIG. 6B depicts a rectifier/charge pump 650 implemented with NMOS and complementary p-channel metal-oxide semiconductor (PMOS) transistors as rectifying elements. The source of NMOS transistor 654 is coupled to a PUMP node 656 which in turn is coupled to an RF+ input 658.

The gate of NMOS transistor 654 is coupled to another RF− input 660, which has a different phase than RF+ input 658, and is also coupled to DC bias 602 via an RF block 662, which serves to isolate the RF signal originating from RF− input 660 and the DC signal provided by DC bias 602. The DC bias 602 is further coupled to the drain of NMOS transistor 654 and anode (AN) node 670, which remain at DC with respect to the circuit substrate (instead of RF like the gate and source of NMOS transistor 654) due to the RF blocking action of RF block 662. Similarly, the drain of PMOS transistor 664 is coupled to PUMP node 656 and RF input 658 and its gate is coupled to DC bias 666 via RF block 668 and also to RF input 660. The DC bias 666 is further coupled to the source of PMOS transistor 664 and cathode (CATH) node 672, both of which remain at DC with respect to the substrate.

Figure 7A:
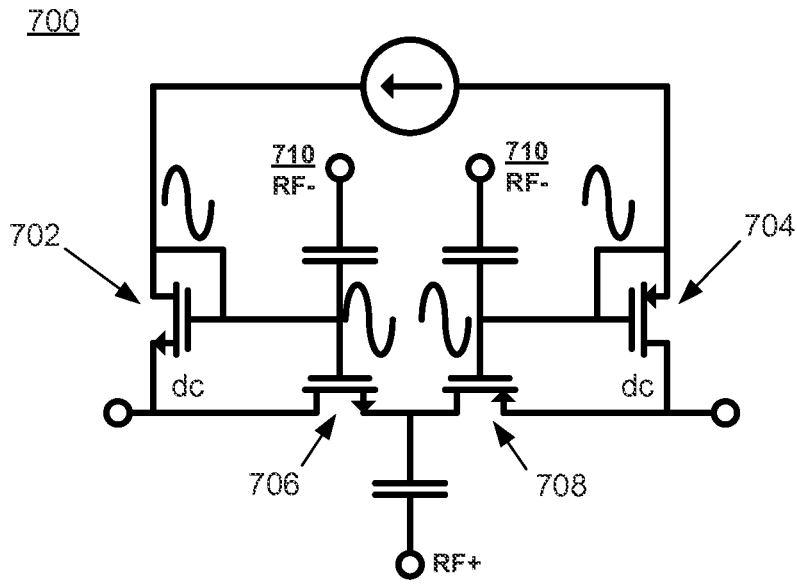
FIGS. 7A and 7B illustrate PMOS/NMOS circuit topologies with and without RF block circuit elements.

In embodiments where bias batteries are implemented using bias transistors, high-resistance RF blocks (e.g., RF blocks 662 and 668) may be desirable for preventing terminals of the bias transistors from pumping. FIG. 7A illustrates a PMOS/NMOS topology rectifier 700 without RF blocks. Rectifier 700 includes NMOS transistor 706 and PMOS transistor 708 in its main current path. NMOS transistor 706 is biased with bias transistor 702 and PMOS transistor 708 is biased with bias transistor 704. For example, current flowing through the bias transistors 702 and 704 (as indicated by the unlabeled current source) may provide a DC component, thereby generating bias voltages at the gates of transistors 706 and 708. While the source and drain of bias transistors 702 and 704, respectively, remain at DC, their other terminals are coupled to RF input 710 and therefore to a time-varying RF signal. The combination of a DC signal at one bias transistor terminal (the source of transistor 702 or the drain of transistor 706) and RF signals at other bias transistor terminals results in distortion of the bias voltages generated by the bias transistors 702 and 704 at the gates of transistors 706 and 708.

Figure 7B:
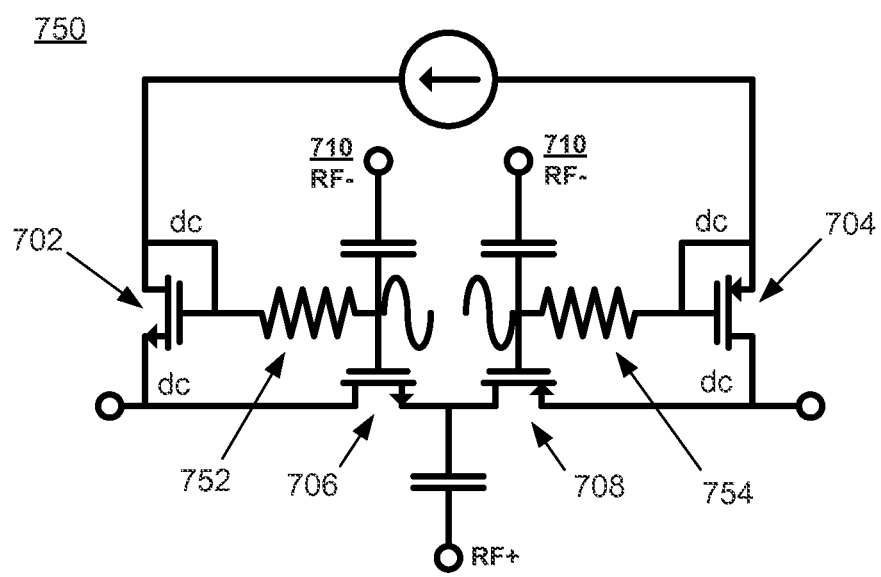

FIG. 7B illustrates a PMOS/NMOS topology rectifier 750 similar to rectifier 700, except also including RF blocks 752 and 754. The RF blocks 752 and 754 are high-electrical-resistance elements positioned between the RF input 710 and the terminals of bias transistors 702 and 704, and prevent the RF signal from RF input 710 from reaching and pumping the bias transistors 702 and 704. However, adequate RF signal blocking may involve relatively high electrical resistance, and high-resistance RF blocks may be difficult to implement in integrated circuits.

Figure 8:
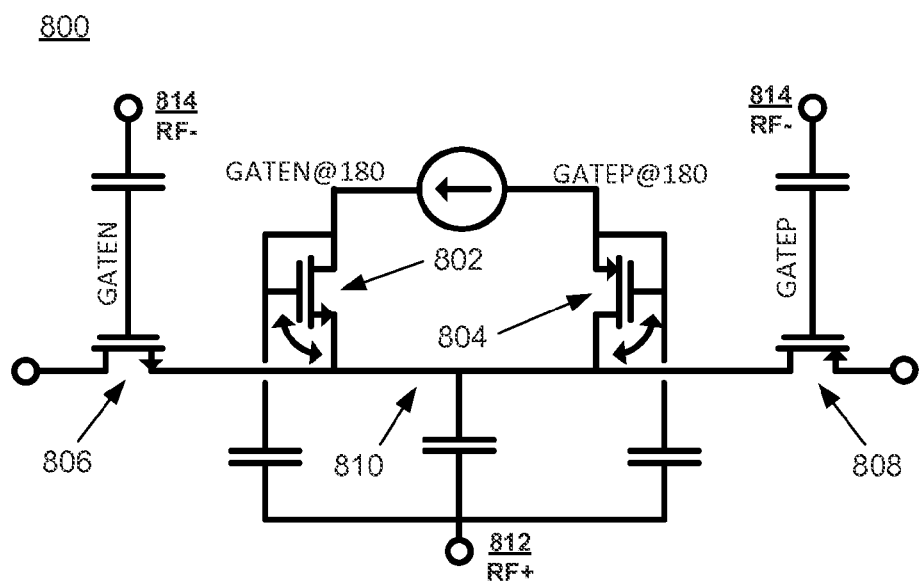
FIG. 8 depicts a circuit block implemented using a hot RF configuration according to embodiments.

In some embodiments, the use of high-resistance RF blocks can be avoided by coupling bias elements to the RF-sides of rectifying elements (e.g, the PUMP node 656) instead of their DC sides (e.g., the anode 670 or cathode 672) in what may be known as a "hot RF" configuration. FIG. 8 depicts a circuit block 800 implemented using a hot RF configuration according to embodiments. Circuit block 800 includes as NMOS rectifying transistor 806 whose source terminal is connected to pumping node 810, which in turn is connected to the drain terminal of PMOS rectifying transistor 808 and RF+ input 812. Circuit block 800 also includes NMOS bias transistor 802 and PMOS bias transistor 804 connected to pumping node 810 via source and drain terminals, respectively (and hence to the source of NMOS rectifying transistor 806, the drain of PMOS rectifying transistor 808, and RF+ input 812). The NMOS bias transistor 802 and PMOS bias transistor 804 are coupled to a current source (not labeled), and may be configured to provide or receive bias currents having RF and/or DC components from pumping node 810. The gate and drain of NMOS bias transistor 802 is connected to one end of the current source, and has the time-varying voltage associated with RF− input 814 but shifted by 180°. The gate and source of PMOS bias transistor 804 is connected to the other end of the current source, and also has the time-varying voltage associated with RF− input 814 shifted by 180°. Thus, by using the "hot RF" configuration in which bias elements (e.g., bias transistors 802 and 804) are placed on the pump/RF side of rectifying elements (e.g., rectifying transistors 806 and 808), as opposed to their DC sides, the bias transistor gate, source, and drain terminals can be coupled to time-varying RF signals with the same voltage phase and amplitude, instead of having some terminals coupled to DC nodes and some terminals coupled to RF nodes, as was the case in FIG. 7A. As a result, although the absolute voltages on the bias transistor gate, source, and drain terminals are varying, all of them are varying in substantially the same way, and the bias voltages provided by the bias transistors are substantially constant and not distorted. In some embodiments, if a bias transistor is configured with a bulk (or substrate) terminal, the bulk terminal may not be coupled to a time-varying RF signal, and may instead be DC.

Figure 9:
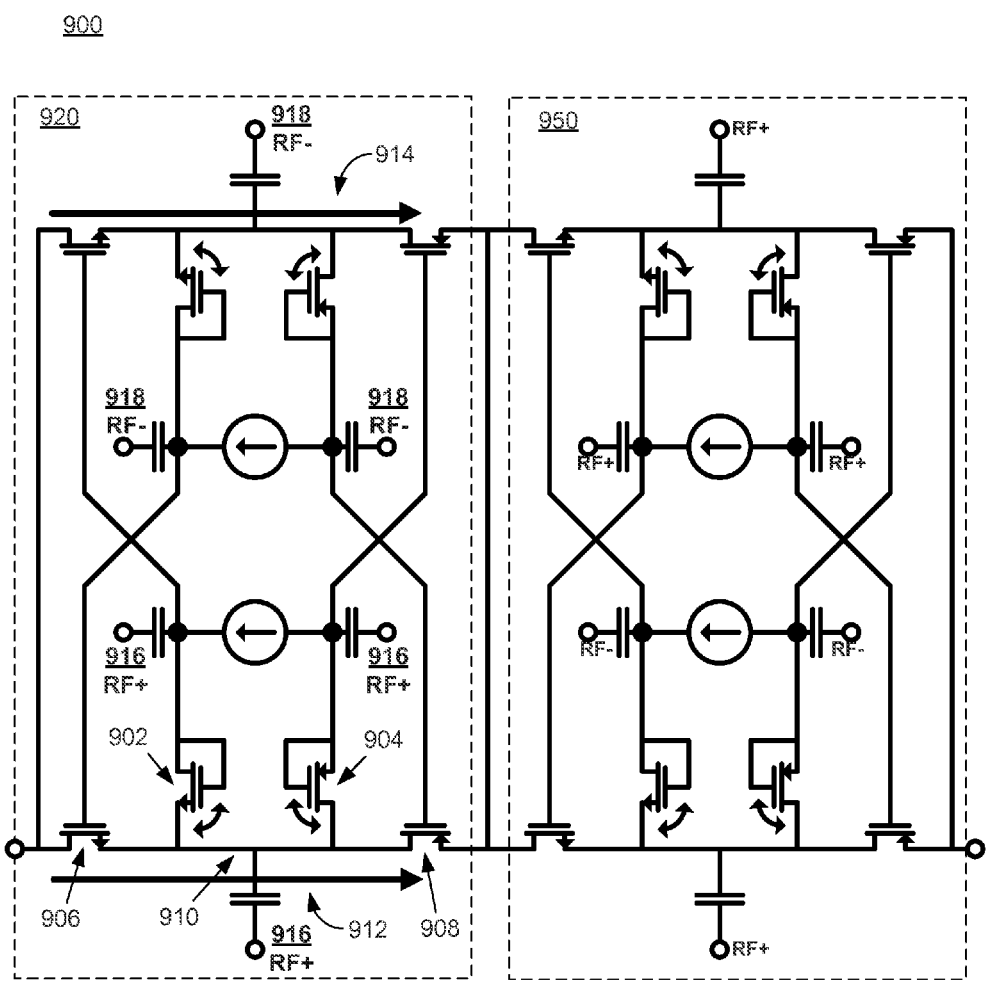
FIG. 9 depicts a dual-path hot RF rectifier according to embodiments.

The 180°-shifted input to the biasing elements may be provided in a number of ways. For example, the phase-shifted input may be provided via an alternative current path. FIG. 9 depicts a dual-path hot RF rectifier 900 according to embodiments. The rectifier 900 has a first stage 920 and a second, similar stage 950, although in other embodiments a rectifier may have more or fewer stages. Each stage includes at least two current paths 912 and 914, each of which pass through at least two rectifying elements (e.g., an NMOS transistor and a PMOS transistor) and a pump node. For example, current path 912 passes through NMOS transistor 906, PMOS transistor 908, and pump node 910. Two diode-connected bias transistors 902 and 904 (similar to bias transistors 802 and 804 in FIG. 8) couple to pump node 910. The diode-connected terminals of bias transistors 902/904 are also connected to rectifying elements in the alternate current path 914 and to RF+ input 916, which in turn is shifted by 180° from RF− input 918. As a result, voltages at the gate, source, and drain terminals of the bias transistors 902 and 904 vary together with substantially the same phase and amplitude (i.e., the same phase and amplitude as the RF signal from RF+ input 916), and the bias transistors 902 and 904 allow undistorted bias voltages to be supplied to rectifying elements with respect to the pump node 910.

Figure 10:
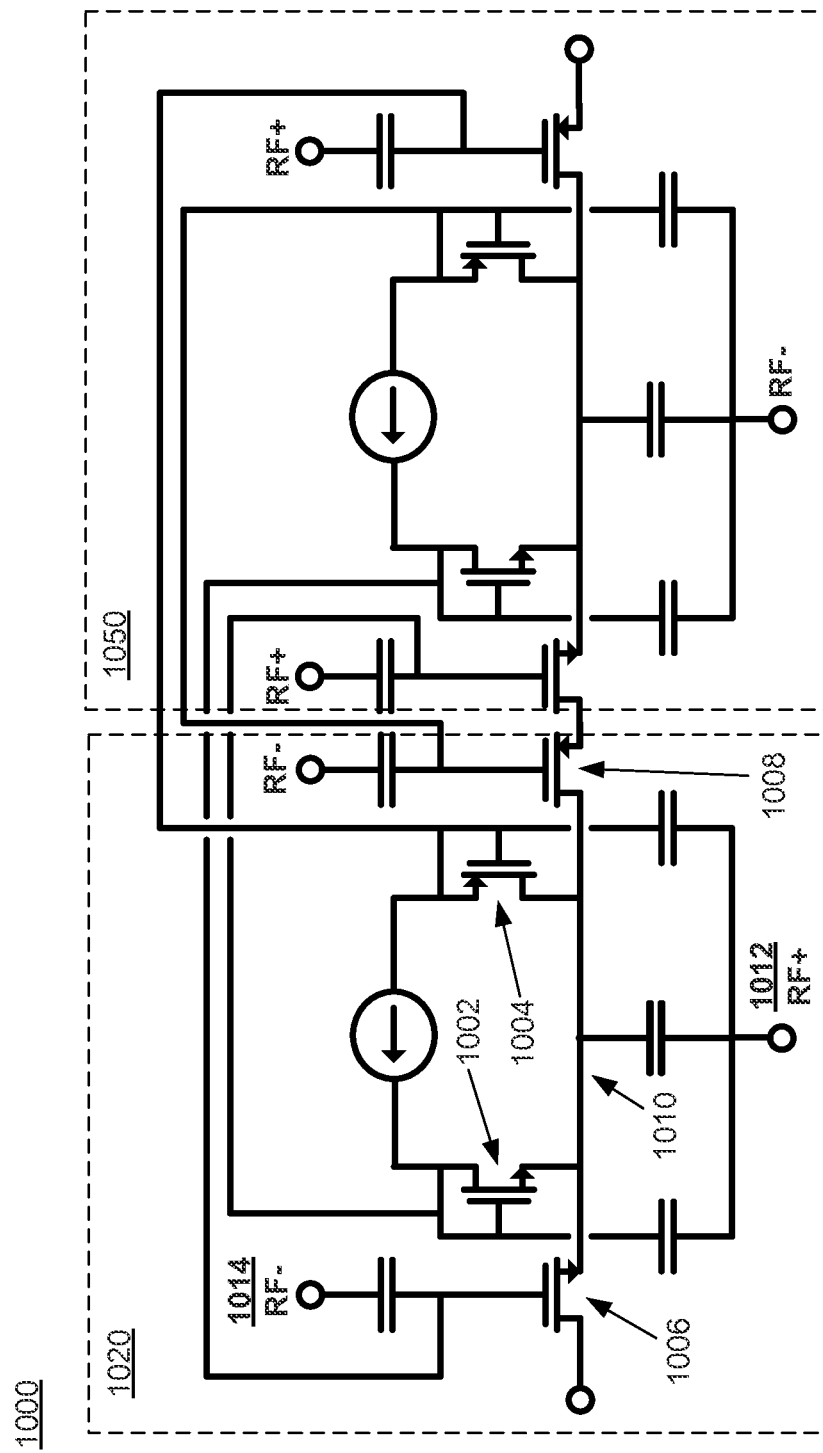
FIG. 10 depicts an adjacent hot RF rectifier according to embodiments.

FIG. 10 depicts an adjacent hot RF rectifier 1000 according to embodiments, where the 180°-shifted input to biasing elements may be provided from an adjacent stage. The rectifier 1000 has a first stage 1020 and a second, similar stage 1050, although in other embodiments a rectifier may have more stages. The main current path may pass through NMOS transistor 1006, PMOS transistor 1008, and pump node 1010, as well as through the equivalent path in the second stage 1050. Bias transistors 1002 and 1004 (similar to bias transistors 902 and 904 in FIG. 9) couple to pump node 1010, and are also coupled to RF+ input 1012, both from the first stage 1020 and the second stage 1050. As a result, bias transistors 1002 and 1004 have gate, source, and drain terminal voltages that vary together with substantially the same phase and amplitude (i.e., that of the RF signal from RF+ input 1012), and allow undistorted bias voltages to be supplied to rectifying elements with respect to the pump node 1010.

While rectifying elements and biasing elements are described above as including transistors, in other embodiments other devices or components may be included. For example, a rectifying or biasing element may include one or more diodes, such as a Schottky diode.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

Embodiments as described herein additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in a number of ways, such as Read Only Memory (ROM), Random Access Memory (RAM), etc., some of which are volatile and some nonvolatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present invention.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A power rectifier stage for a Radio Frequency Identification (RFID) integrated circuit (IC), the rectifier stage comprising:
a first rectifying element coupled to a first phase of a radio frequency (RF) waveform;
a pump node coupled to a second phase of the RF waveform and the first rectifying element;
a second rectifying element coupled to the first phase of the RF waveform and the pump node; and
a first biasing element coupled to the pump node and having a plurality of terminal voltages, wherein:
the first rectifying element, the pump node, and the second rectifying element form a first current path; and
every terminal voltage of the first biasing element varies with a phase and amplitude similar to a phase and amplitude of the second phase of the RF waveform.

2. The rectifier stage of claim 1, wherein at least one of the first rectifying element, the second rectifying element, and the first biasing element includes at least one of a transistor and a Schottky diode.

3. The rectifier stage of claim 1, wherein the first rectifying element includes a transistor of a first type and the second rectifying element includes a transistor of a second type complementary to the first type.

4. The rectifier stage of claim 1, wherein the first biasing element includes a diode-coupled bias transistor.

5. The rectifier stage of claim 1, wherein the first biasing element includes a bias transistor and the plurality of terminal voltages includes a gate terminal voltage of the bias transistor, a source terminal voltage of the bias transistor, and a drain terminal voltage of the bias transistor, but excludes a bulk terminal voltage of the bias transistor.

6. The rectifier stage of claim 1, further comprising a second biasing element including a second bias transistor complementary to a first bias transistor in the first biasing element.

7. The rectifier stage of claim 1, wherein a bias current flows between the first biasing element and the pump node.

8. The rectifier stage of claim 7, wherein the bias current has a DC component.

9. The rectifier stage of claim 1, wherein the first biasing element is further coupled to at least one of:
another rectifying element in a second current path different from the first current path; and
another rectifying element in another rectifying stage in the first current path.

10. A Radio Frequency Identification (RFID) integrated circuit (IC), the IC comprising:

a first rectifier stage including:
  a first rectifying element coupled to a first phase of a radio frequency (RF) waveform;
  a pump node coupled to a second phase of the RF waveform and the first rectifying element;
  a second rectifying element coupled to the first phase of the RF waveform and the pump node; and
  a first biasing element coupled to the pump node and having a plurality of terminal voltages, wherein:
the first rectifying element, the pump node, and the second rectifying element form a first current path; and
every terminal voltage of the first biasing element varies with a phase and amplitude similar to a phase and amplitude of the second phase of the RF waveform.

11. The IC of claim 10, wherein at least one of the first rectifying element, the second rectifying element, and the first biasing element includes at least one of a transistor and a Schottky diode.

12. The IC of claim 10, wherein the first rectifying element includes a transistor of a first type and the second rectifying element includes a transistor of a second type complementary to the first type.

13. The IC of claim 10, wherein the first biasing element includes a diode-coupled bias transistor.

14. The IC of claim 10, wherein the first biasing element includes a bias transistor and the plurality of terminal voltages includes a gate voltage of the bias transistor, a source voltage of the bias transistor, and a drain voltage of the bias transistor, but excludes a bulk voltage of the bias transistor.

15. The IC of claim 10, further comprising a second biasing element including a second bias transistor complementary to a first bias transistor in the first biasing element.

16. The IC of claim 10, wherein a bias current flows between the first biasing element and the pump node.

17. The IC of claim 16, wherein the bias current has a DC component.

18. The IC of claim 10, wherein the first biasing element is further coupled to at least one of:
  another rectifying element in a second current path different from the first current path; and
  another rectifying element in another rectifying stage in the first current path.

19. A method for a Radio Frequency Identification (RFID) rectifier to rectify radio frequency (RF) waveforms, the method comprising:
  receiving an RF waveform; and
  generating a first current in a first current path by:
    coupling a first rectifying element in the first current path to a first phase of the RF waveform;
    coupling a pump node in the first current path to a second phase of the RF waveform and the first rectifying element;
    coupling a second rectifying element in the first current path to the first phase of the RF waveform and the pump node; and
    biasing the pump node using a first biasing element coupled to the pump node and having a plurality of terminal voltages, wherein every terminal voltage varies with a phase and amplitude similar to a phase and amplitude of the second phase of the RF waveform.

20. The method of claim 19, further comprising coupling the first biasing element to at least one of:
  another rectifying element in a second current path different from the first current path; and
  another rectifying element in an adjacent rectifying stage in the first current path.

* * * * *